Oct. 7, 1930.     W. TIMSON     1,778,006
AUTOMATIC AND SEMIAUTOMATIC WEIGHING SCALE
Filed March 21, 1929      2 Sheets-Sheet 1
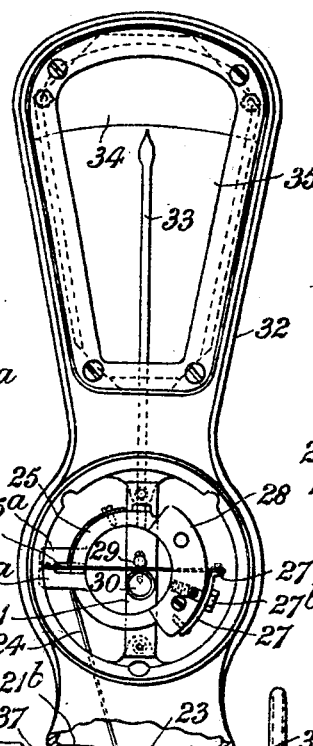
*Fig. 1.*
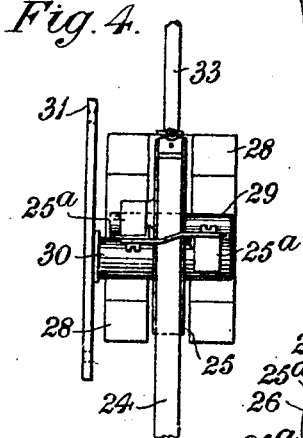
*Fig. 4.*
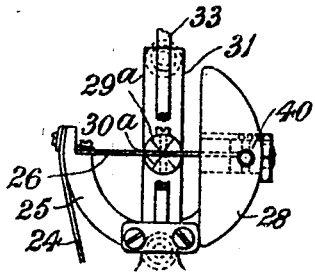
*Fig. 6.*
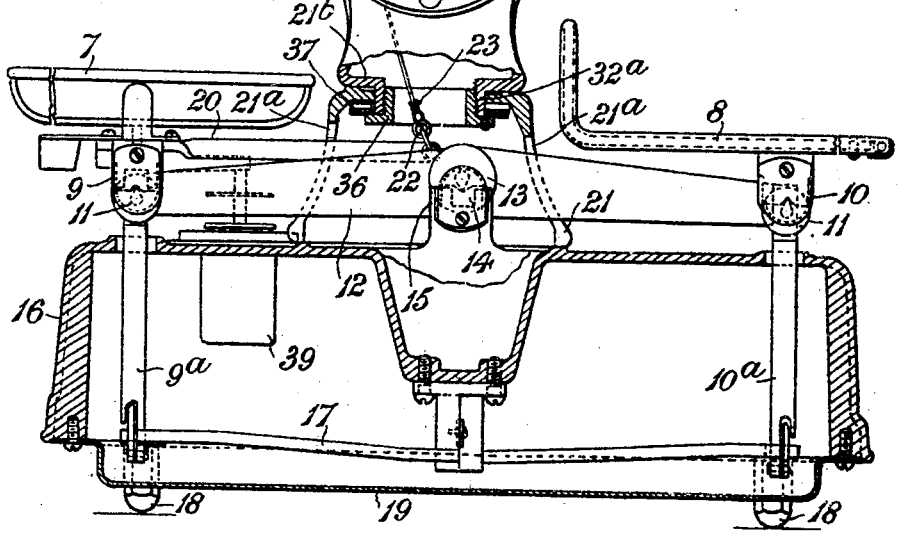
Inventor:—
William Timson
by George S. Folker
his Attorney Oct. 7, 1930.                W. TIMSON                1,778,006
            AUTOMATIC AND SEMIAUTOMATIC WEIGHING SCALE
               Filed March 21, 1929        2 Sheets-Sheet 2
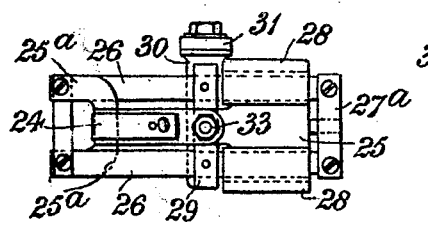
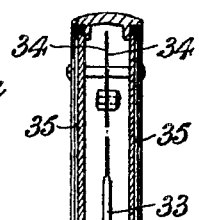
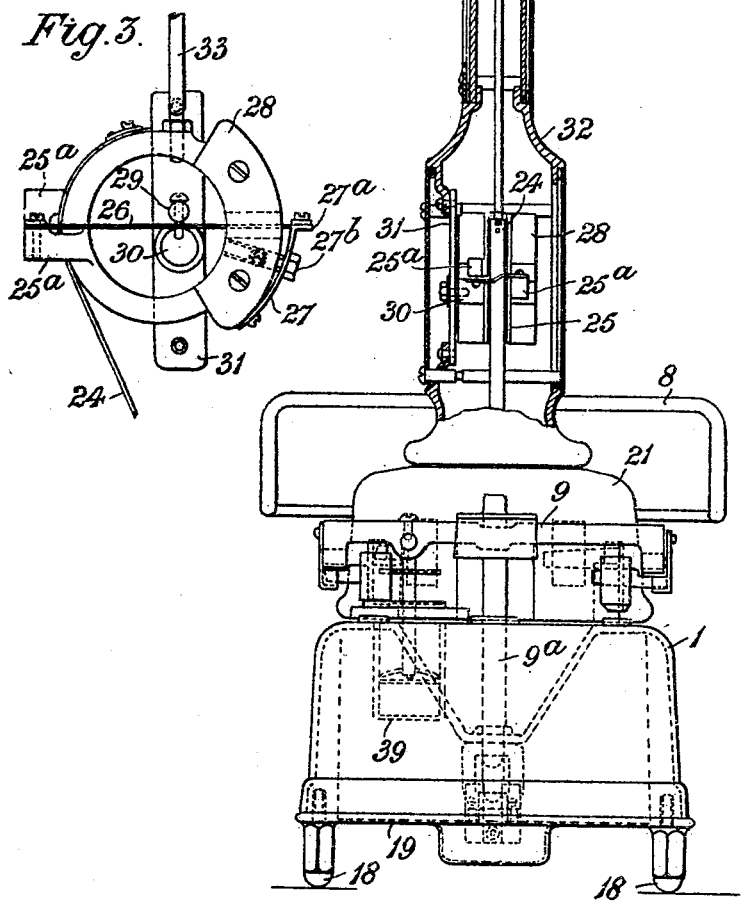
Inventor:—
William Timson
by George E. Folkes.
his Attorney Patented Oct. 7, 1930

1,778,006

UNITED STATES PATENT OFFICE

WILLIAM TIMSON, OF BIRMINGHAM, ENGLAND, ASSIGNOR TO W. & T. AVERY LIMITED, OF BIRMINGHAM, ENGLAND

AUTOMATIC AND SEMIAUTOMATIC WEIGHING SCALE

Application filed March 21, 1929, Serial No. 348,875, and in Great Britain August 14, 1928.

This invention has reference to improvements in or relating to automatic and semi-automatic weighing scales.

In connection with automatic and semi-automatic weighing scales employing pendulous resistant mechanism it has been proposed to locate the said resistant mechanism together with the allied indicating mechanism within a casing capable of being rotated for admitting of the setting of the indicating mechanism in any angular setting relatively to the weighbeam. As is well known, however, weighing scales employing pendulous resistants are susceptible to errors due to the scales being set out of level with the result that in practice scales of the said kind embodying rotatable resistant indicating mechanism are unsatisfactory in that adjustment of the indicating mechanism is desirable for each setting thereof. In addition, with scales of the said kind, the position of the indicating mechanism cannot be adjusted during a weighing operation without introducing errors.

The present invention has for its object the provision of an improved construction of automatic or semi-automatic weighing scale which is simple in construction, efficient in operation and wherein the angular setting of the indicating mechanism relatively to the weighbeam is capable of being varied when and as required without effecting the accuracy of a weighing operation.

The invention consists of an improved automatic or semi-automatic weighing scale wherein a movable member of the weighing system is connected to an automatic spring resistant and indicating mechanism and wherein the said indicating mechanism is located within a rotatable casing said spring resistant and the means of connection between the movable member of the weighing system and the spring resistant admitting of the rotation of the casing together with the indicating mechanism without impairing the accuracy of a weighing operation. The invention also resides in the improved means of connecting the movable member of the weighing system to the automatic spring resistant and indicating mechanism through a member embodying a length of chain. The invention further resides in the method of mounting the indicating mechanism and in the details of construction of the semi-automatic weighing scale hereinafter to be described.

The invention will now be described with reference to the accompanying sheet of drawings, wherein:—

Figure 1 is a part sectional front elevation of a semi-automatic counter weighing scale constructed in accordance with the invention.

Figure 2 is a part sectional end elevation of the weighing scale seen in Figure 1.

Figure 3 is a front elevation of the resistant mechanism employed in the scale illustrated in Figures 1 and 2 detached from the scale.

Figure 4 is an end elevation of Figure 3.

Figure 5 is a plan of Figure 3, and

Figure 6 is a detail view in front elevation illustrating a modified means of mounting the resistant.

In the drawings like numerals of reference indicate similar parts in the several views.

The weight and goods pans 7 and 8 are carried by supports 9, 10 which are mounted on knife-edges 11 secured to an even-armed lever 12 adjacent to the ends thereof, said even-armed lever 12 being fulcrumed on knife-edges 13 supported in bearings 14 carried by an upstanding bracket member 15 formed integral with and located on the upper side of a dome shaped base housing 16 of the ordinary kind.

The supports 9 and 10 for the scale pans are provided with legs 9$^a$, 10$^a$ respectively which depend within the base housing 16 and are interconnected by a knife-edged stay 17 for preserving the true vertical motion of the scale pans in the known manner. The base housing 16 is supported on adjustable feet 18 and the lower end thereof is normally closed by a plate 19. Bolted to or formed integral with the support 9 for the weights pan 7 is an inwardly directed arm 20 the inner portion whereof projects through an elongated slot 21ᵃ formed in the wall of a tubular member 21 which is supported on the upper side of the base housing 16. At its inner end the arm 21 is provided with a hole through which is passed the lower link of a length of chain 22 composed of three links. The upper link of the length of chain 22 is passed through a hole formed in a shackle or clamp 23 attached to the lower end of a flexible ribbon 24 the other end whereof is anchored to the periphery of the cam surface of an annular eccentrically disposed frame 25 adjacent to the highest point thereof. This frame 25 is provided at one side with an outwardly projecting forked arm 25ᵃ to each of which is clamped the end of one of a pair of horizontally disposed flexible strip resistants 26 the other ends whereof are anchored to a transversely disposed section 27ᵃ of a resilient plate 27 bolted at its lower end to a weighted mass 28 screwed to the portion of the frame 25 opposite to the arm 25ᵃ the said weighted mass being symmetrically disposed relatively to the resistant strips 26. Intermediate its length the resilient plate 27 is provided with a hole through which is passed a screw bolt 27ᵇ adapted to engage within a tapped recess formed in the frame. The resilient plate 27 normally tends to move outwards by virtue of the inherent resilience of the metal.

At the centre the flexible strip resistants 26 are interposed between two superposed substantially cylindrical members 29 and 30 carried by a bracket 31 supported from a casing 32 rotatably mounted on the aforesaid tubular member 21.

The upper cylindrical member 29 is capable of being secured to the lower member whereby the central line of the resistants may be clamped between the adjacent faces of the said members 29 and 30 subsequent to the adjustment of the tension of the flexible strip resistants 26.

The frame 25 has attached thereto an indicating pointer 33 adapted to register with a pair of charts 34 located within the casing 32, the index head of the pointer 33 and the charts 34 being visible through windows 35 formed at each side of the casing 32.

The casing 32 is provided at its lower end with a cylindrical depending flange 32ᵃ which is adapted to be passed through a circular hole formed in an inwardly turned flange 21ᵃ located at the upper end of the tubular member 21. The casing 32 is secured to the tubular member 21 by means of a locknut 36, a spring washer 37 being interposed between the adjacent surfaces of the flange on the tubular member and the locknut.

The engagement between the casing 32 and the tubular member 21 is of a nature such as to permit of a ready rotation of the casing through an angle of 90° stops being provided for limiting the degree of motion permitted to the casing to 90°.

It will be understood that as a weight indication is afforded on each side of the casing this movement gives the requisite settings normally required. If preferred, however, the casing 32 may be adapted for rotation through 360°.

The even-armed lever has a pivotal connection to the piston rod of a dashpot the cylinder 39 wherefor is carried by the base housing.

It will be understood that the point of connection between the length of chain 22 and the inwardly directed arm 20 is on the vertical axis of the casing 32.

In the modification illustrated in Figure 6, the plate 27 is dispensed with and the ends of the resistants 26 previously connected thereto are attached to a threaded bush or bushes 40 which are adjustable within a correspondingly tapped recess or recesses formed in the weighted mass for the purpose of admitting of the regulation of the tension of the resistant strips 26, grub screws or the like being provided for locking the bush or bushes in a set position.

In this modification the cylindrical members 29 and 30 are replaced by substantially triangularly shaped members 29ᵃ and 30ᵃ respectively and furthermore the frame 25 is of a bow shaped formation.

It will be appreciated that the method of mounting the flexible strip resistant 26 permits of the ready adjustment of the tension thereof. Furthermore, as weighing scales embodying automatic spring resistants of the kind described are not subject to errors due to variation in the level of the setting of the scale and as the casing 32 containing the indicating mechanism is rotatable relatively to the tubular member 21, and as this motion is readily allowed by the length of chain 22 embodied in the connecting means between the inwardly directed arm 20 and the frame 25 it will be seen that the rotation of the indicating mechanism may be effected during a weighing operation without affecting the accuracy of the scale and without entailing errors such as occur with weighing apparatus embodying pendulous resistants if the head is turned during a weighing operation and in the event of the scale being out of level.

In addition the apparatus is simple in construction, efficient in operation and capable of being produced at a relatively low cost.

What I claim is:—

1. A self indicating weighing scale embodying a base, a lever system mounted on said base, a movable member connected to said lever system, a housing for enclosing said lever system, a casing rotatably mounted relatively to said housing, a frame the opposite sides whereof are connected by a horizontally disposed flexible spring strip resistant mechanism, means for anchoring the centre of the strip resistant mechanism to the aforesaid casing, indicating means carried by the frame, co-operating indicating means mounted in the casing and flexible connecting means between the frame and the movable member attached to the lever system the point of connection of the said flexible means to the movable member being located on the vertical axis of the casing, said connecting means admitting of the rotation of the casing, indicating mechanism and resistant mechanism at any time without impairing the accuracy of a weighing operation.

2. A self indicating weighing scale embodying a base, a lever system mounted on said base, a housing for enclosing said lever system, a member movable with the lever system, a casing rotatably mounted relatively to said base, a frame located within the casing, horizontally disposed flexible spring strip resistant mechanism connecting opposite sides of said frame, a weighted mass secured to the said frame on one side of the central vertical axis, a cam carried by the opposite side of the frame, means for anchoring the centre of the strip resistant mechanism to the casing, indicating means secured to the frame, indicating charts carried by the casing and adapted to co-operate with said indicating means and flexible means connecting the said cam to the aforesaid movable member the point of connection of the flexible means to the movable member being located on the vertical axis of the casing said means admitting of the rotation of the casing, indicating mechanism and resistant mechanism at any time without impairing the accuracy of a weighing operation.

3. A self indicating weighing scale embodying a base, a lever system supported from said base, a member movable with the lever system, a housing for enclosing the lever system, a casing rotatably mounted relatively to said base, a frame disposed within said casing, a horizontally disposed flexible spring strip resistant mechanism connecting opposite sides of the frame, a weighted mass carried by a frame on one side of the vertical axis thereof, a cam surface carried by the opposite side of the frame, means for anchoring the centre of the strip resistant mechanism to the casing, an indicating means carried by the frame, indicating charts mounted in the casing and adapted to co-operate with said indicating means, a flexible ribbon attached at its upper end to the cam surface, a length of chain anchored at one end to the lower end of the flexible ribbon and at its other end to the movable member attached to the lever system, the point of connection of said chain to the movable member being located on the vertical axis of the casing, said means admitting of the rotation of the casing, indicating mechanism and resistant mechanism at any time without impairing the accuracy of a weighing operation and means for effecting the adjustment of the tension of the flexible strip resistant mechanism.

In testimony whereof, I have signed my name to this specification.

WILLIAM TIMSON.